(12) United States Patent
James

(10) Patent No.: US 11,021,245 B2
(45) Date of Patent: Jun. 1, 2021

(54) VTOL AIRCRAFT

(71) Applicant: ROLLS-ROYCE plc, London (GB)

(72) Inventor: Darren I James, Derby (GB)

(73) Assignee: ROLLS-ROYCE plc, London (GB)

( * ) Notice: Subject to any disclaimer, the term of this patent is extended or adjusted under 35 U.S.C. 154(b) by 190 days.

(21) Appl. No.: 16/450,167

(22) Filed: Jun. 24, 2019

(65) Prior Publication Data
US 2020/0017208 A1    Jan. 16, 2020

(30) Foreign Application Priority Data
Jul. 12, 2018  (GB) ...................... 1811400

(51) Int. Cl.
| | | |
|---|---|---|
| B64C 29/00 | (2006.01) | |
| B64C 3/56 | (2006.01) | |
| B64C 25/66 | (2006.01) | |

(52) U.S. Cl.
CPC ............ B64C 29/0008 (2013.01); B64C 3/56 (2013.01); B64C 25/66 (2013.01)

(58) Field of Classification Search
CPC ....... B64C 29/0008; B64C 3/56; B64C 25/66; B64C 39/12; B64C 2201/102
See application file for complete search history.

(56) References Cited

U.S. PATENT DOCUMENTS

| | | | | |
|---|---|---|---|---|
| 5,951,608 A | * | 9/1999 | Osder ..................... | B64C 39/12 701/11 |
| 6,070,831 A | * | 6/2000 | Vassiliev .................. | B64C 1/00 244/117 R |
| 2013/0206921 A1 | * | 8/2013 | Paduano ................ | B64C 13/16 244/70 |
| 2014/0014764 A1 | | 1/2014 | Lundgren | |
| 2014/0312177 A1 | | 10/2014 | Gaonjur | |
| 2017/0305526 A1 | * | 10/2017 | Thomassey ............ | B64C 27/26 |
| 2020/0039629 A1 | * | 2/2020 | Bosworth ................ | B64C 3/56 |

FOREIGN PATENT DOCUMENTS

| | | |
|---|---|---|
| CN | 103832585 A | 6/2014 |
| CN | 107089316 A | 8/2017 |
| CN | 207257983 U | 4/2018 |
| EP | 1686057 A2 | 8/2006 |
| GB | 2550489 A | 11/2017 |
| JP | 4085716 B2 | 5/2008 |

OTHER PUBLICATIONS

Oct. 23, 2019 European Search Report issued in European Patent Application No. 19181738.6.
Dec. 20, 2018 Search Report issued in GB Patent Application No. 1811400.9.

* cited by examiner

*Primary Examiner* — Rodney A Bonnette
(74) *Attorney, Agent, or Firm* — Oliff PLC

(57) ABSTRACT

A vertical take-off and landing aircraft is shown. The VTOL aircraft has a main wing having a left wing and a right wing configured as folding wings, and one or more of a foreplane, having a left canard and a right canard configured as folding wings, and/or a tailplane, having a left stabiliser and a right stabiliser configured as folding wings. Each one of the folding wings has a fixed inboard section and a folding outboard section. The folding outboard section is downwardly foldable to a landing condition to support the aircraft on a surface.

8 Claims, 6 Drawing Sheets

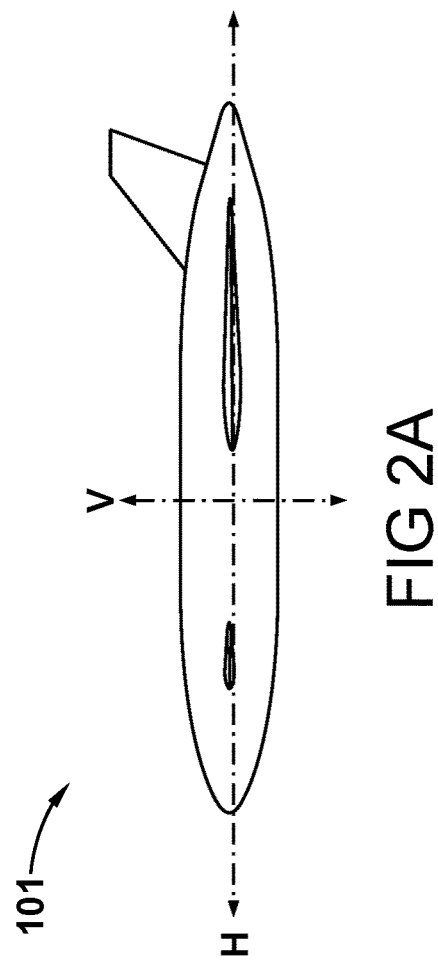
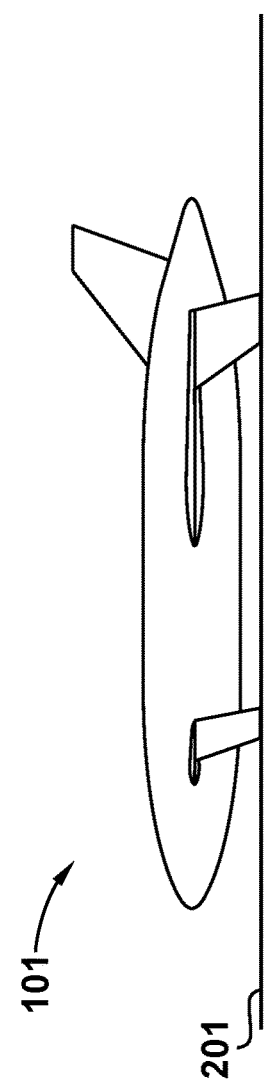

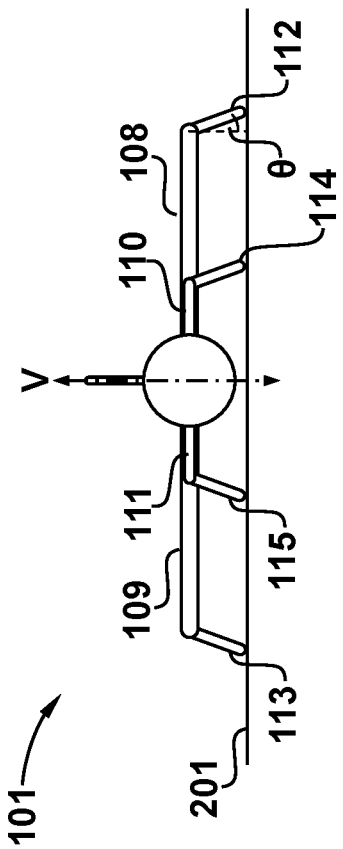
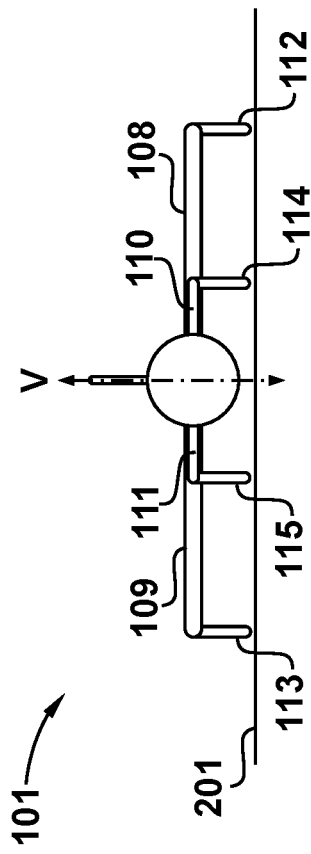

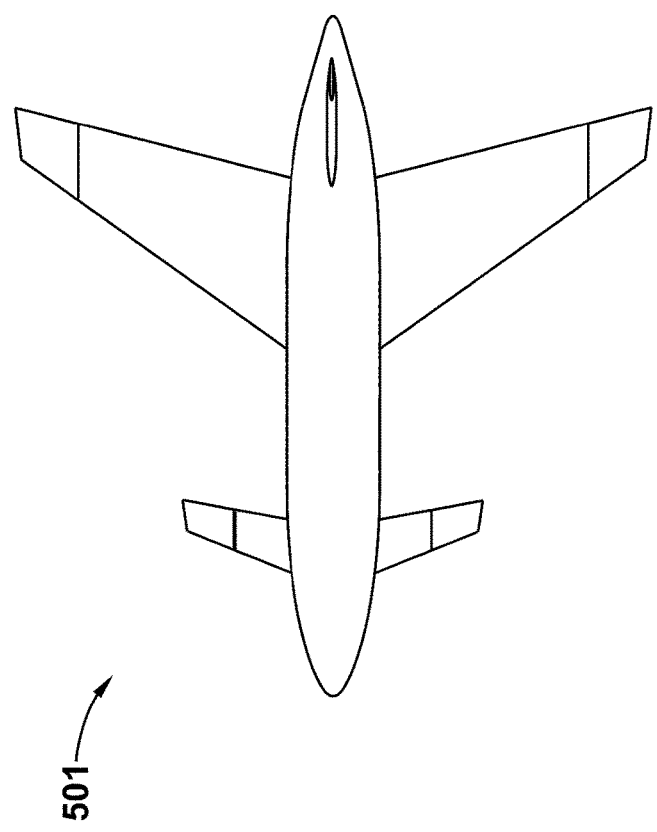
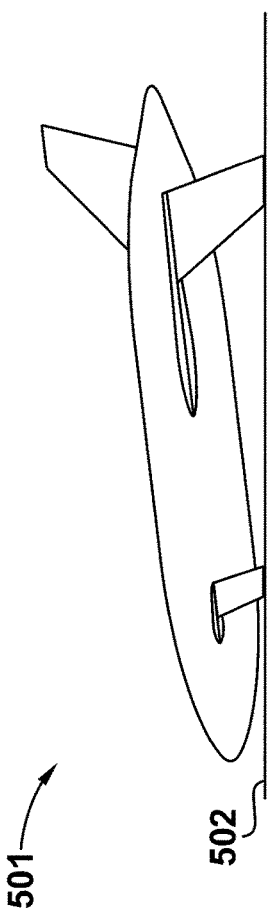
FIG 5A
FIG 5B

VTOL AIRCRAFT

TECHNICAL FIELD

This disclosure relates to vertical take-off and landing (VTOL) aircraft.

BACKGROUND

VTOL aircraft are known. It is desirable in such aircraft to reduce weight to thereby minimise the disc loading required for take-off.

SUMMARY

In an aspect, a vertical take-off and landing aircraft comprises:
a main wing comprising a left wing and a right wing configured as folding wings; and
one or more of:
a foreplane, comprising a left canard and a right canard configured as folding wings; or
a tailplane, comprising a left stabiliser and a right stabiliser configured as folding wings;
wherein each one of said folding wings has a fixed inboard section and a folding outboard section, the folding outboard section being downwardly foldable to a landing condition to support the aircraft on a surface.

Thus, the need for undercarriage is removed and weight is saved. This is because, being of VTOL configuration, the aircraft does not need to taxi and therefore does not require wheels, brakes, or suspension, etc.

BRIEF DESCRIPTION OF THE DRAWINGS

Embodiments will now be described by way of example only with reference to the accompanying drawings, which are purely schematic and not to scale, and in which:

FIGS. 2A and 2B show a side-on view, respectively, the aircraft of FIG. 1 in cruise and landing conditions;
FIGS. 3A and 3B show a head-on view, respectively, the aircraft of FIG. 1 in landing conditions with two different possible angles for the folding outboard sections;
FIGS. 5A and 5B show a VTOL aircraft of a third embodiment in cruise and landing conditions respectively.

DETAILED DESCRIPTION

Figure 1:
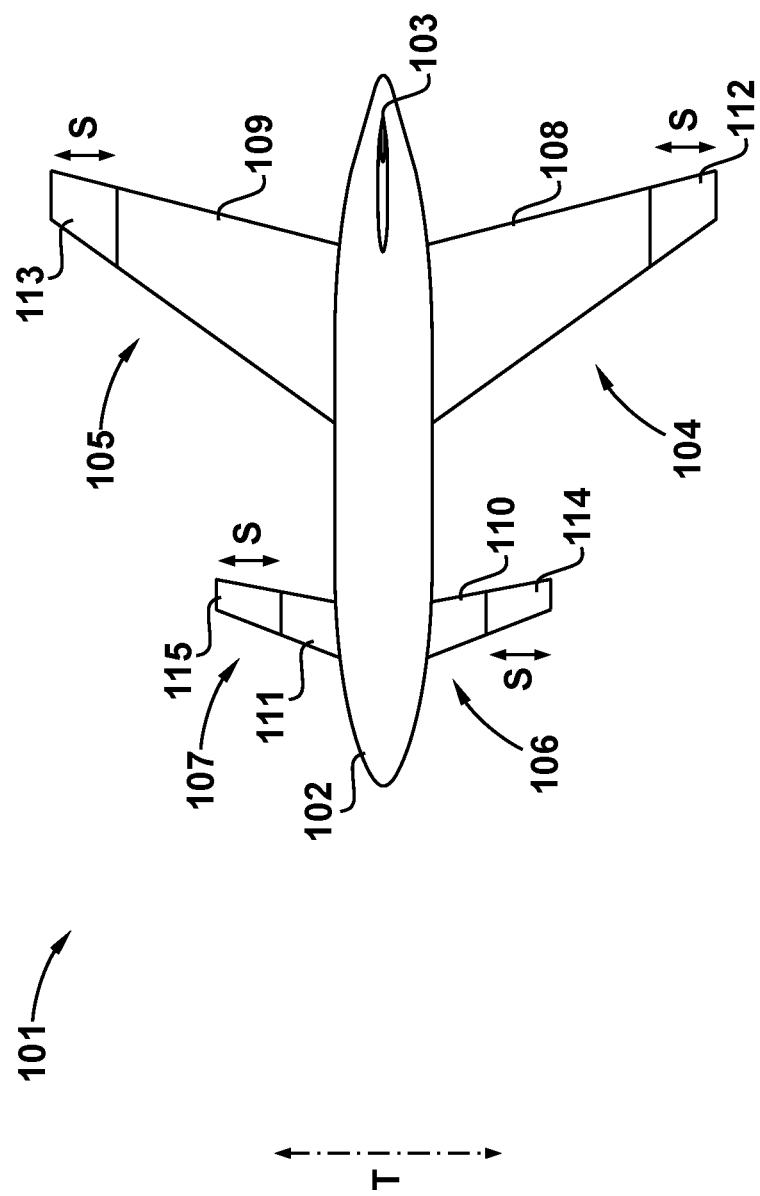
FIG. 1 shows a VTOL aircraft of a first embodiment.

FIG. 1 illustrates a VTOL aircraft 101. The propulsion system has been omitted for the purposes of clarity. In this example, the aircraft 101 comprises a fuselage 102, a tailfin 103, and a main wing comprising a left wing 104 and a right wing 105. The aircraft 101 further comprises a foreplane comprising a left canard 106 and a right canard 107.

Each one of the left wing 104, right wing 105, left canard 106, and right canard 107 are configured as folding wings and in operation are downwardly foldable. They thus include respective fixed inboard sections 108, 109, 110, and 111, along with respective foldable outboard sections 112, 113, 114, and 115. Each one of the left wing 104, right wing 105, left canard 106, and right canard 107 includes a folding mechanism (not shown) to facilitate the downward folding.

The folding mechanism may include a hydraulically-actuated hinge system, for example. Similar actuation systems may be used to implement the folding mechanism.

Broadly, the configuration of the foldable outboard sections 112, 113, 114, and 115 is such that, taking into account the relative positioning of the main wing and the foreplane on the aircraft, the aircraft will adopt a desired attitude in its landing condition.

Thus, in the embodiment of FIG. 1, for example, the outboard sections 112, 113, 114, and 115 each have the same span S in the transverse direction T.

FIG. 2A illustrates the aircraft 101 in cruise condition. The aircraft has mutually perpendicular longitudinal (L) and vertical (V) axes. In this example, the main wing and the foreplane are located at the same height with respect to the vertical axis V of the aircraft 101. The vertical axis V is also referred to in the art as the yaw axis of the aircraft, which is oriented perpendicularly to the roll axis of the aircraft 101, and parallel to its fuselage stations. Further, position and therefore height with respect to this axis may also be referred to as the water line. Thus with reference to the embodiment of FIG. 2A, it may be said that the main wing and the foreplane are located at the same water line.

Thus, as illustrated in FIG. 2B, in the landed condition, the aircraft 101 sits level on a surface 201 by virtue of the same span S for each outboard section, and the positioning of the wing and foreplane at the same height. In the present examples, each outboard section 112, 113, 114, and 115 has a wingtip comprising a pad for contacting the surface 201.

FIG. 3A shows a head-on view of the aircraft 101 in the landed configuration. In this particular example, the foldable outboard sections 112, 113, 114, and 115 are foldable such that they are parallel to the vertical axis V of the aircraft 101. In this particular example, the dihedral angle of the wings of the aircraft is zero, and thus the foldable outboard sections 112, 113, 114, and 115 make an angle of 90 degrees to the fixed inboard sections 108, 109, 110, and 111.

FIG. 3B shows a head-on view of the aircraft 101 in the landed configuration, however in this example the foldable outboard sections 112, 113, 114, and 115 are not parallel to the vertical axis V of the aircraft 101 and form an angle $\theta$ relative to the vertical axis V. It will be appreciated that in this example, as the angle $\theta$ is the same for each one of the foldable outboard sections 112, 113, 114, and 115, the span S thereof remains the same. However, should the angle $\theta$ be different as between the main wing and the foreplane, the span may be adjusted such that the desired attitude is achieved in the landing condition.

Figure 4A:
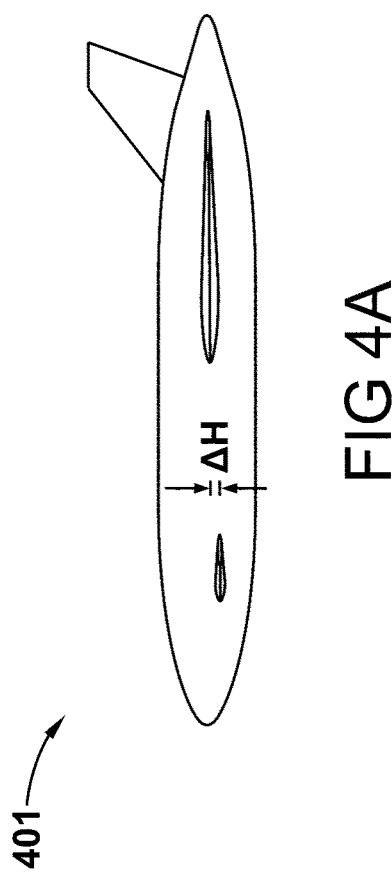
FIGS. 4A and 4B show a VTOL aircraft of a second embodiment in cruise and landing conditions respectively.

A VTOL aircraft of a second embodiment is shown in FIG. 4A, and is identified with reference numeral 401. In this example, the aircraft 401 is substantially identical to aircraft 101, save for the main wing and foreplane differing in terms of the location with respect to the vertical axis V by an amount $\Delta H$. Thus, in other words they are positioned at different water lines, separated by amount $\Delta H$.

Figure 4B:
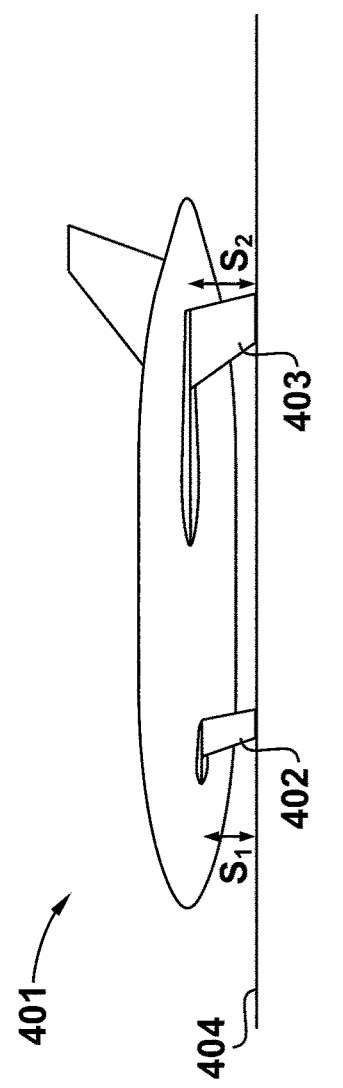

As shown in FIG. 4B, this means that the respective span of the outboard sections of the main wing and foreplane may be configured to be different in terms of their transverse extent. As illustrated in the Figure, the foreplane has a left canard which has an outboard section 402, and the main wing has a left wing which has an outboard section 403. In this example, the outboard sections are configured to fold such that they are parallel with the vertical axis V of the aircraft. In order to sit on surface 404, the outboard section 402 has a span S1 whilst the outboard section 403 has a span S2, where S1 and S2 differ by ΔH. It will be appreciated that a similar situation exists on the right-hand side of the aircraft 401.

In an alternative example, in which the foldable outboard sections 112, 113, 114, and 115 fold in the manner shown in FIG. 3B and thus have a non-zero angle θ relative to the vertical axis V of the aircraft, the spans S1 and S2 will differ by an amount ΔH/cos θ. It will be appreciated however that should different fold angles be adopted as between the outboard sections on the main wing and foreplane, then the difference in span will be altered accordingly such that the aircraft adopts the required attitude in the landed condition.

It will be appreciated that the embodiments of the preceding Figures have included squared-off wingtips. However, for aerodynamic reasons, it may be beneficial to include non-squared-off wingtips. FIG. 5A is a plan view of an aircraft 501 that incorporates such a configuration. FIG. 5B illustrates the aircraft 501 in a landing configuration on a surface 502. Those skilled in the art will understand how the span and wingtip angle relative to the roll axis of the aircraft 501 may be configured to achieve the configuration of FIG. 4B.

Figure 6:
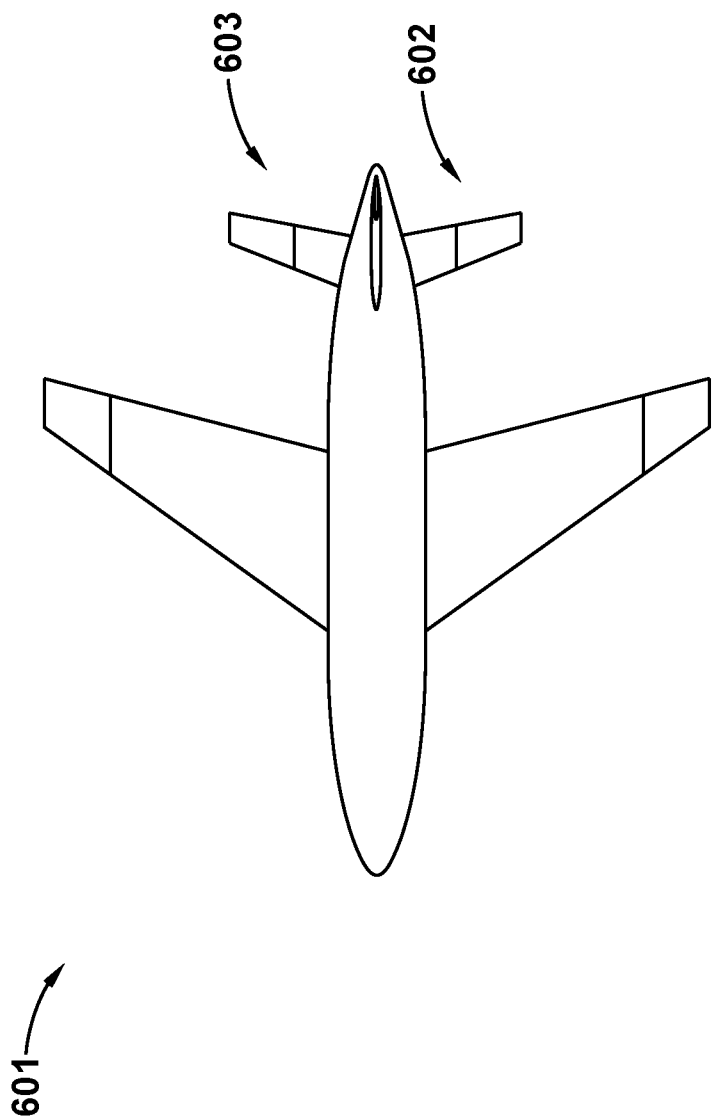
FIG. 6 shows a VTOL aircraft of a fourth embodiment.

A VTOL aircraft of a second embodiment is shown in FIG. 6, and is identified with reference numeral 601. In this example the aircraft 601 includes a tailplane rather than a foreplane, and thus includes a left stabiliser 602 and a right stabiliser 603. As with the embodiment of FIG. 1, the left stabiliser 602 and right stabiliser 603 are configured as folding wings. In operation, they are downwardly foldable to a landing condition to support the aircraft on a surface. The tailplane may adopt any of the other configurations of the various examples described herein in relation to the foreplane, the appropriate changes being required being apparent to those skilled in the art.

It will be appreciated that in alternative configurations the aircraft may include both a foreplane and a tailplane in addition to the main wing, each being configured as folding wings and thereby having downwardly foldable outboard sections to support the aircraft on a surface in a landing condition.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A vertical take-off and landing aircraft comprising:
   a main wing comprising a left wing and a right wing configured as folding wings; and
   one or more of:
   a foreplane, comprising a left canard and a right canard configured as folding wings, and/or
   a tailplane, comprising a left stabilizer and a right stabilizer configured as folding wings;
   wherein each one of said folding wings has a fixed inboard section and a folding outboard section, the folding outboard section being downwardly foldable to a landing condition to support the aircraft on a surface.

2. The aircraft of claim 1, wherein each folding outboard section has a wingtip comprising a pad configured to contact the surface.

3. The aircraft of claim 1, in which the main wing and foreplane and/or tailplane are located at the same height with respect to a vertical axis of the aircraft.

4. The aircraft of claim 1, in which each folding outboard section has the same span.

5. The aircraft of claim 1, in which the main wing and foreplane and/or tailplane are separated in height by an amount ΔH with respect to a vertical axis of the aircraft.

6. The aircraft of claim 5, in which the folding outboard section of the left wing and the right wing have a span that differs by the amount ΔH from the span of the folding outboard sections of the left canard and the right canard and/or left stabilizer and right stabilizer.

7. The aircraft of claim 1, in which each folding outboard section folds to an angle parallel with a vertical axis of the aircraft.

8. The aircraft of claim 1, in which each folding outboard section folds to form a non-zero angle with a vertical axis of the aircraft.

* * * * *